Figure 1:
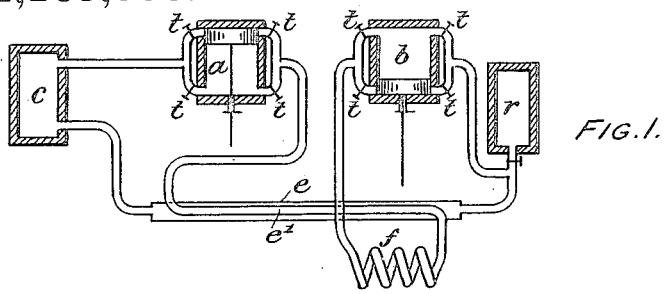

T. VUIA.
HOT AIR ENGINE WITH CLOSED CIRCUIT.
APPLICATION FILED JAN. 6, 1909.

1,169,308.  Patented Jan. 25, 1916.

Witnesses—
Stanley Wood
Robert Owen Hughes

Inventor
T. Vuia
by
W. T. Evans
Attorney

UNITED STATES PATENT OFFICE.

TRAJAN VUIA, OF NEUILLY-ON-SEINE, FRANCE.

HOT-AIR ENGINE WITH CLOSED CIRCUIT.

1,169,308.  Specification of Letters Patent.  Patented Jan. 25, 1916.

Application filed January 6, 1909. Serial No. 470,943.

*To all whom it may concern:*

Be it known that I, TRAJAN VUIA, engineer, a subject of the King of Hungary, residing at Neuilly-on-Seine, in the Republic of France, have invented a new and useful Hot-Air Engine with Closed Circuit, of which the following is a specification.

Hot air engines, notwithstanding their very high theoretical efficiency and notwithstanding the great hopes to which they at first gave rise, have not become at all general and their improvement has hardly advanced at all. The principal reason for this result is their excessive size. As the engines constructed only employed air at atmospheric pressure, as the power of a thermal engine is a function of the quantity of the intermediary fluid, the cylinder of such an engine is of such exaggerated dimensions that it becomes almost impossible to construct and use a hot air engine of high power. As these engines did not comprise distinct heating surfaces, it was the cylinders themselves that were heated by the furnace. The employment of a higher pressure could not therefore become practical having regard to the fact that the heating surface was limited by the volume of the cylinder. Moreover, in a thermal engine the heat is not economically utilized unless the intermediary agent serving for the conversion of the heat into work is subjected to a very great fall of temperature. In thermal engines in general this condition is fulfilled by an expansion prolonged to the maximum extent in the driving cylinder. Now these hot air engines act only within very restricted pressure limits, although within somewhat high limits of temperature, so that an expansion equal to or even comparable with that obtained in steam engines was impossible. At first sight, therefore, the attainment of the theoretical cycle in these engines would not appear to be practicable by expansion. This defect in hot air engines is merely apparent, however, because the fall of temperature, which is the condition for the production of work in a thermal engine, can be obtained by a method which consists in replacing the two adiabatic curves in the Carnot cycle by a process consisting in yielding up the heat at the outlet from the driving cylinder to an intermediary body which permits first of all of storing it and then restoring it. This body stores the heat of the hot intermediary agent and restores it in yielding it up in its turn to this same agent cold. The temperature exchangers termed regenerators and intended to fulfil this function, do so very ineffectively, however, so that their employment in hot air engines was almost entirely abandoned, although their utility was incontestable. Even the engines provided with such regenerators utilized a certain expansion in the driving cylinder, which necessitated a compression in the delivery cylinder, factors which inevitably modified the cycle, because the effects of the expansion were destroyed by the losses due to the subsequent compression; the advantages of the expansion were therefore nullified.

The engines in which high initial pressures have been employed, although few in number, were still less successful owing to the absence of appreciation of the important part played by the regenerator, because they utilized a cycle which excluded the very possibility of employing a regenerator.

The present invention relates to a novel hot air engine with a closed cycle in which the temperature of a portion of the mass of air or of some other gas compressed to a high pressure, is sometimes raised and sometimes lowered in two separate chambers by the intermediary of two cylinders, by means of a generator, an exchanger-generator and a refrigerator. The cylinders, one of which is a delivery cylinder and the other a driving cylinder, are of different diameters. Their volumes are proportionate to the volume occupied by the same quantity of air or gas at the same pressure at the temperature of the generator and of the refrigerator respectively. In the driving cylinder the driving stroke takes place with full admission and expansion is not resorted to.

Figure 2:
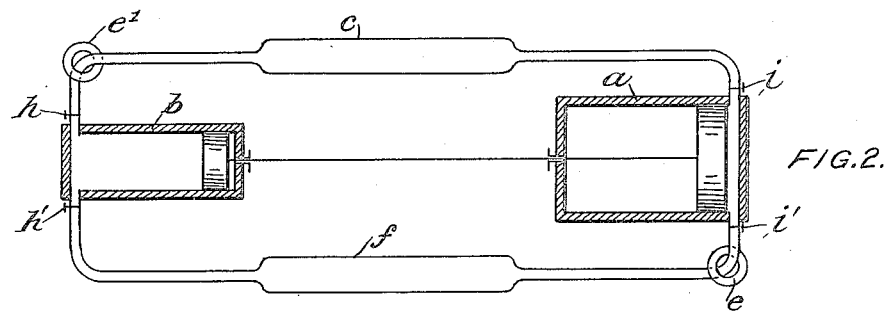
Figure 3:
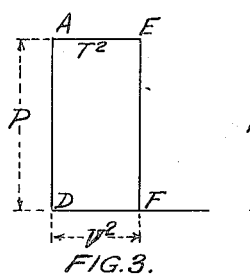
Figure 4:
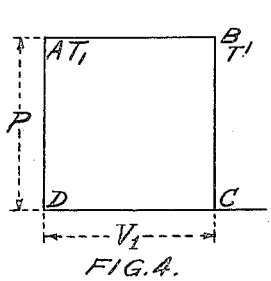
Figure 5:
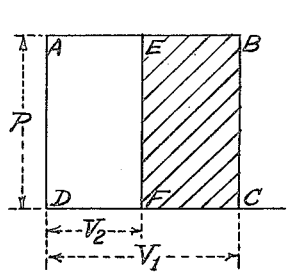
Figure 6:
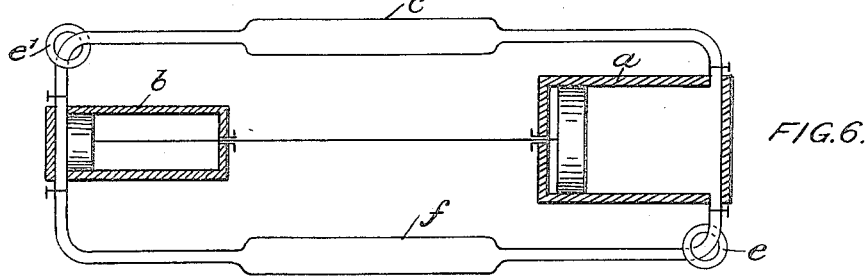

In the accompanying drawings: Figure 1 shows a diagrammatic section of the engine. Figs. 2 and 6 are diagrams of the engine with the pistons in opposite positions in the respective cylinders, while Figs. 3, 4, 5, 7 and 8 are diagrams illustrating the operation of the machine.

The engine consists of a cylinder $a$ containing the driving piston, of a cylinder $b$ in which the delivery piston moves, of a generator $c$, of an exchanger regenerator $e$ $e^1$ and of a refrigerator $f$. The compressed air coming from the delivery cylinder $b$ passes through the outer tube of the exchanger-regenerator $e$ $e^1$ and enters the reheater or generator $c$ where it becomes heated to the maximum temperature of the cycle and enters the driving cylinder $a$ the piston of which it displaces. This cylinder remains in communication with the generator $c$ throughout the entire stroke of the piston. At the end of this admission stroke, the communication with the generator ceases and in the return stroke of the piston, the air, after having traversed the central tube of the exchanger-regenerator $e$ $e^1$, and also the refrigerator $f$, where it becomes cooled to the minimum temperature of the cycle, is drawn into the cylinder $b$ whose piston then forces it out through the outer tube of the exchanger-regenerator, into the generator $c$. This passage of the intermediary fluid, serving as vehicle for the heat, from the cylinder $a$ into the cylinder $b$, is effected by a known system of mechanically controlled slide or other valves in the driving cylinder $a$ and by means of a system of automatic or controlled valves in the delivery cylinder $b$; these valves it is unnecessary to describe. The exchanger-regenerator can be constituted by two concentric tubes forming a coil or by a plurality of similar elements connected in series, or by a tube containing a nest of smaller tubes. The fluid traverses these tubes in opposite directions. The hot fluid issuing from the driving cylinders $a$ in entering the central tube, yields up its heat to the outer tube through which the cold fluid coming from the cylinder $b$ passes. There is therefore a continuous exchange of temperature between the two currents. The refrigerator $f$ is a coil immersed in a liquid which is cooled or renewed by the usual methods. It may also consist of a nest of tubes cooled by air.

The apparatus may comprise a compressed air reservoir $r$. The replacement of the air lost by leakage is obtained from a small auxiliary compressor which sends compressed air into the reservoir, or if there is no reservoir, into the generator, as soon as the pressure falls below the desired or predetermined limit.

The engine is preferably double-acting and the two cylinders can be superposed, in which case the two pistons are mounted upon the same rod.

The intermediary fluid need not necessarily be air, as any other compressed or liquefied gas will answer the purpose.

The following is a description of the theory and operation of the engine.

In the description, $L_u$=useful work; $L_1$= the work produced by the piston of the driving cylinder during the full admission; $L_2$= the work of compression absorbed by the delivery of the air from the hot cylinder into the cold delivery cylinder; P=the pressure in the generator; $p$=the pressure in the refrigerator; $T_1$=the absolute temperature in the generator; $T_2$=the absolute temperature in the refrigerator; $V_1$=the volume of the working cylinder; $V_2$=the volume of the delivery cylinder; G=the quantity of air in a cylinder.

Referring to Fig. 2, the cylinder $b$ contains the quantity of air G at the temperature T, of a volume $V_2$ and of a pressure $p$. The valves $h_1$ and $i_1$ are closed, while the valves $h$ and $i$ are open. The two pistons move from right to left. The quantity of air G contained in the cylinder $b$ of volume $V_2$, at the temperature $T_2$ and at the pressure P is delivered through the regenerator $e^1$ and the generator $c$ into the cylinder $a$ where it acquires the volume $V_1$. While the air changes from the volume $V_2$ to the volume $V_1$ at the constant temperature $T_1$, the piston $b$ has absorbed the work indicated in Fig. 3 by the area AEFDA, while the piston $a$ has produced the work indicated in the Fig. 4 by the area ABCDA. The positive work is indicated in the Fig. 5 by the area EBCFE, and consequently it is equal to the work which the quantity of air G produces in expanding from the volume $V_2$ to the volume $V_1$ at the constant temperature $T_1$. This work $$L_1 = RGT_1 \log. n\frac{V_1}{V_2}; \text{ (for air R} = 29{,}272).$$

Referring now to Fig. 6, the cylinder $a$ is filled with the same quantity of air G at a temperature $T_1$ and pressure P. The valves $h$ and $i$ are closed, while the valves $h_1$ and $i_1$ are open. The two pistons move from left to right. This serves to deliver the quantity of air G of the volume $V_1$ from the cylinder $a$ into the cylinder $b$, through the regenerator $e$ and the refrigerator $f$. The volume becomes reduced to $V_2$ and the temperature to $T_2$. In compressing the quantity of air G from the volume $V_1$ to the volume $V_2$ at the constant temperature $T_2$ of the refrigerator, the work indicated in Fig. 7 by the area EC'CDE is absorbed and this work is equal to the work of compression:

$$L_2 = RGT_2 \log. n\frac{V_1}{V_2}.$$

Figures 7, 8:
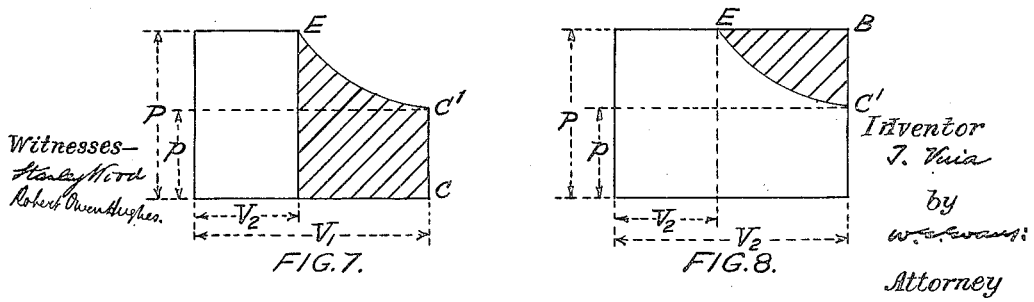

The useful work $L_u$ is indicated in the Fig. 8 by the area EBC'E. This work is equal to the work of expansion which the quantity of air G produces in expanding from the volume $V_2$ to the volume $V_1$ at the constant temperature $T_1$ (the area EBCFE Fig. 5) less the work of compression which is absorbed in compressing the quantity of air G of volume $V_1$ to the volume $V_2$ at the constant temperature $T_2$ (the area EBC'E Fig. 8).

$$L_u = L_1 - L_2 = RG(T_1 - T_2) \log. n\frac{V_1}{V_2}$$

The yielding up of heat to the regenerator $e$ $e^1$ takes place during the delivery of air from the cylinder $a$ into the cylinder $b$ (in Fig. 8 on the line BC'). The absorption of heat from the regenerator $e$ $e^1$ takes place during the delivery of air from the cylinder $b$ into the cylinder $a$ (in Fig. 5 on the line AE). The quantity of heat given out by the fluid on the line BC' is equal to that which is absorbed on the line AE. In this case for the two transformations BC' and AE $$\int \frac{dQ}{T} = 0$$

and if $Q_1$ and $Q_2$ are the same quantities of heat used up following EB and C'E:

$$\frac{Q_1}{T_1} = \frac{Q_2}{T_2}$$

where $$\int = \frac{Q_1 - Q_2}{T_1} = \frac{T_1 - T_2}{T_1}$$

This cycle has thus a maximum as in Carnot's cycle, under the condition that it would be possible to store the heat yielded by the fluid. Accordingly, all the difficulties which oppose the realization of the Carnot cycle in hot air machines are avoided by reason of the use of a regenerator.

In the hot air machines hitherto it was necessary to constitute the regenerator with a body of considerable calorific capacity and with the smallest volume with respect to that of the cylinder; for this volume, in practice, was objectionable. This was quite impossible to secure as it was necessary above all to insure the passage of the air. Now, the air would be throttled on account of the smallness of the volume.

The machine which is the object of the present invention indicates for the first time in what way it is necessary to proceed to secure a cycle not comprising adiabatic transformations and permitting the use of a regenerator. This machine has distinct heating and cooling chambers working with high initial pressures. This process avoids all the difficulties relating to the use of a regenerator. Its volume is no longer an objection. While in the regenerator hitherto it set up a mean and consequently prejudicial temperature, in the present regenerator the process is carried out in such a way that the air becomes heated in three or four stages which permits a very high temperature to be established in the apparatus. Finally, this regenerator is a heat exchanger, for it possesses two chambers of which the one is traversed by hot air and the other by cold air. The two currents pass in opposite directions the one to the other and cross each other in the apparatus. The exchange of heat operates thus without throttling or counterpressure.

What I claim as my invention and desire to secure by Letters Patent is:

A thermodynamic process which consists in subjecting a constant mass of a gaseous medium to the following cycle of operations: 1st, imparting heat to said mass at a constant high temperature and pressure while enlarging its volume in the performance of work through the conversion of said heat into dynamic effect; 2nd, reducing the volume of said mass after the performance of said work, at a constant lower temperature and pressure, by passing it successively through a regenerator and a refrigerator, and 3rd, restoring said mass to its original high pressure and temperature by repassing it through said regenerator and then through a heater, preliminarily to the conversion of the heat into work.

TRAJAN VUIA.

Witnesses:
 H. C. COXE,
 THOMAS DRAGU.